United States Patent Office 3,420,917
Patented Jan. 7, 1969

3,420,917
TRIS(DISUBSTITUTED PHOSPHENYL ETHYL) PHOSPHINE OXIDES
Chisung Wu, Kendall Park, N.J., assignor to Union Carbide Corporation, a corporation of New York
No Drawing. Filed Dec. 2, 1965, Ser. No. 511,258
U.S. Cl. 260—932  4 Claims
Int. Cl. C07f 9/02

ABSTRACT OF THE DISCLOSURE

A new class of phosphine oxides comprising the tris(disubstituted phosphinyl ethyl)phosphine oxides represented by the formula:

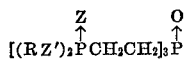

wherein Z and Z' represent oxygen or sulfur and R represents a monovalent hydrocarbon group having up to 18 carbon atoms when alkyl and up to 10 carbon atoms when aryl. These oxides may be made by reacting a vinyl phosphine oxide or a vinyl phosphonate or its sulfur analogue with elemental phosphorus and aqueous alkali.

---

The invention relates to a new class of phosphine oxides. More particularly, the invention relates to a new class of compositions comprising the tris(disubstituted phosphinylethyl) phosphine oxides.

The phosphine oxides of the invention can be represented by Formula I:

I 

wherein Z and Z' represents oxygen or sulfur, and wherein R represents a monovalent hydrocarbon group. The said hydrocarbon groups can have substituent groups that are inert to aqueous alkali.

The compositions of the invention can be produced by reacting a vinyl phosphine oxide or a vinylphosphonate (or sulfur analogue thereof) with elemental phosphorus and aqueous alkali. The following reaction, in which R and Z have the significance stated above, is illustrative:

$$9(RZ')_2\overset{Z}{\overset{\uparrow}{P}}CH{=}CH_2 + P_4 + 2KOH + 4H_2O \longrightarrow$$

$$3(RZ')_2\overset{Z}{\overset{\uparrow}{P}}CH_2CH_2)_3\overset{O}{\overset{\uparrow}{P}} + K_2HPO_3$$

These compositions of the invention are produced by reacting the $$(RZ')_2\overset{Z}{\overset{\uparrow}{P}}CH{=}CH_2$$

reactant with elemental phosphorus in the presence of aqueous alkali. This reaction can be carried out by slowly adding the aqueous alkali to a stirred mixture of the elemental phosphorus and the said $$(RZ')_2\overset{Z}{\overset{\uparrow}{P}}CH{=}CH_2$$

reactant. The phosphorus can be molten or it can be finely divided if the reaction temperature is below the melting point of phosphorus (i.e., about 46° C.). The reaction temperature is not narrowly critical and it can vary widely, for instance, from about 0° C. to about 175° C., and preferably from about 15° C. to about 75° C. The reaction is mildly exothermic, and conventional heat transfer means can be used to maintain the desired reaction temperature. The reaction is continued for a period of time sufficient to produce the desired product, usually from about 10 minutes to about 10 hours, and preferably from about 30 minutes to about 5 hours.

Atmospheric pressure is normally employed for the reaction, although super-atmospheric or sub-atmospheric pressure can be used if desired. A liquid reaction medium can be employed, if desired. Such liquids as ethanol, acetonitrile, butanol, dioxane, tetrahydrofuran, mono- and diethyl ether of ethylene glycol, N,N-dimethylformamide, dimethyl sulfoxide, pyridine, and the like, can be employed as the reaction medium.

The aqueous alkali can be water solutions of sodium hydroxide, potassium hydroxide, lithium hydroxide, calcium hydroxide, or the like. Potassium hydroxide is preferred.

The proportion of the reactants can be stoichiometric, with the stoichiometry being based upon the illustrative equation shown above. Any of the reactants can be employed in excess, if desired.

The product can be recovered by conventional procedures, for instance, by filtration, distillation of the filtrate, and then recrystallization of the distillation residue from a hydrocarbon solvent.

Among the useful compositions provided by the invention are the tris[2-(dialkoxyphosphinyl)ethyl]phosphine oxides that are produced from dialkyl vinylphosphonates. The dialkyl vinylphosphonates can be derived from tertiary phosphites by the following sequence of reactions in which R' has the significance stated above with respect to Formula I:

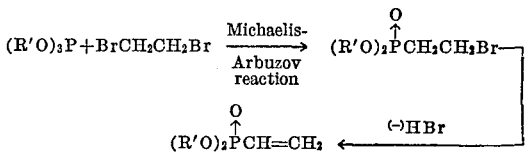

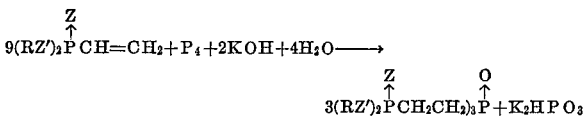

Illustrative compounds within the scope of the fourth class of compounds include:

Tris[2-(dimethoxyphosphinyl)ethyl]phosphine oxide
Tris[2-(diethoxyphosphinyl)ethyl]phosphine oxide
Tris[2-(dipropoxyphosphinyl)ethyl]phosphine oxide
Tris[2-(dibutoxyphosphinyl)ethyl]phosphine oxide
Tris[2-(dipentoxyphosphinyl)ethyl]phosphine oxide
Tris[2-(dihexoxyphosphinyl)ethyl]phosphine oxide
Tris[2-(cyclohexoxyphosphinyl)ethyl]phosphine oxide
Tris[2-(diheptoxyphosphinyl)ethyl]phosphine oxide
Tris[2-(dioctoxyphosphinyl)ethyl]phosphine oxide
Tris[2-(dinonoxyphosphinyl)ethyl]phosphine oxide
Tris[2-(didecoxyphosphinyl)ethyl]phosphine oxide
Tris[2-(diundecoxyphosphinyl)ethyl]phosphine oxide
Tris[2-(dilauroxyphosphinyl)ethyl]phosphine oxide
Tris[2-(dimyristoxyphosphinyl)ethyl]phosphine oxide
Tris[2-(dicetoxyphosphinyl)ethyl]phosphine oxide
Tris[2-(distearoxyphosphinyl)ethyl]phosphine oxide
Tris[2-(methoxyethoxyphosphinyl)ethyl]phosphine oxide.

The alkoxy groups of the above-illustrated class of compounds can have, for instance, up to 18 carbon atoms, preferably up to 12 carbon atoms, and more preferably up to 4 carbon atoms.

By reacting vinylphosphonic dichloride with mercaptans in the presence of a tertiary amine, the thio analogues of the said fourth class of compounds are prepared. Illustrative of such sulfur-containing compounds are tris[2-(di[1-thiaethyl]phosphinyl)ethyl]phosphine oxides, tris[2-(di[1-thiapropyl]phosphinyl)ethyl]phosphine oxide, tris[2-(di[1-thiapentyl]phosphinyl)ethyl]phosphine oxide, and the like.

Further compositions that are within the scope of the invention are the tris[2-(diaryloxyphosphinyl)ethyl]phosphine oxides and their sulfur-containing analogues that can be produced from tertiary triaryl phosphites and tertiary trithioaryl phosphites by procedures analogous to those described above with respect to the said fourth class of compounds. Illustrative of the fifth class of compounds are tris[2 - (diphenoxyphosphinyl)ethyl]phosphine oxide, tris[2 - (di[phenylthio]thiophosphinyl)ethyl]phosphine oxide, tris[2 - (ditolyloxyphosphinyl)ethyl]phosphine oxide, and the like, wherein the aryl group has up to 10 carbon atoms.

The novel phosphine oxides of the invention are widely useful compositions. For instance, they can be employed as additives to improve the flame resistance of many polymers such as vinyl chloride polymers, epoxy resins, phenolic resins, and the like. The tris[2-(di[higher alkoxy] phosphinyl)ethyl]phosphine oxides are useful as plasticizers for vinyl chloride polymers and other polymers. Many of the long chain alkyl-containing phosphine oxides exhibit surface activity and are therefore useful as surfactants. The multiplicity of the polar phosphoryl group makes them strongly complexing ligands for metal ions, and thus useful in metal extraction, and the like.

The following examples illustrate the invention:

EXAMPLE 1

Tris(2-diethoxyphosphinylethyl)phosphine oxide 2.7 milliliters of 10 N aqueous potassium hydroxide was added dropwise in 20 minutes at room temperature to a well-stirred mixture of 1.4 grams of yellow phosphorus, 16.4 grams of diethyl vinylphosphonate, and 30 milliliters of ethanol. The phosphorus disappeared at the end of the hydroxide addition, and the reaction mixture was further stirred for an hour. Evaporation of the reaction mixture under vacuum gave 18.4 grams of an orange viscous liquid residue.

EXAMPLE 2

Tris(2-diethoxyphosphinylethyl)phosphine oxide

The experiment of Example 1 was repeated using acetonitrile as the solvent. The reaction proceeded in the same manner, giving 17 grams of an orange viscous liquid product.

EXAMPLE 3

Tris(2-diethoxyphosphinylethyl)phosphine oxide

To a mixture of 32.8 grams of diethyl vinylphosphonate and 2.8 grams of yellow phosphorus was added 5 milliliters of 10 N aqueous potassium hydroxide dropwise over 60 minutes while maintaining the temperature of the stirred mixture at 35° C. An orange viscous liquid containing a small amount of unreacted phosphorus was obtained. The reaction mixture was heated at 50° C. for 30 minutes after the addition of 0.4 milliliter more of the potassium hydroxide solution. The reaction mixture was then evaporated and extracted with benzene. The benzene solution was evaporated and the residue was heated to 100° C. at 0.1 mm. Hg. There was obtained 22 grams of a light yellow viscous liquid residue, having a phosphorus content of about 23%.

EXAMPLE 4

Reaction of tris(2-diethoxyphosphinylethyl)phosphine oxide with dodecanol

To 11 grams of the product in Example 3 was added 33 grams of n-dodecanol. The mixture was heated to 185–245° C. for about 1 hour. There was obtained 6 milliliters of ethanol. The excess dodecanol in the reaction mixture was distilled out under vacuum, giving 31 grams of a white semi-solid residue which showed surface activity.

What is claimed is:

1. Composition of the formula:

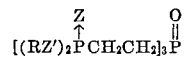

wherein Z and Z' each represents oxygen or sulfur and wherein each R individually represents a monovalent hydrocarbon group that is free of unsaturation other than aromatic unsaturation and has up to 18 carbon atoms when alkyl and up to 10 carbon atoms when aryl.

2. Composition of claim 1 wherein said composition is a tris[2-(dialkoxyphosphinyl)ethyl]phosphine oxide.

3. Composition of claim 2 wherein said alkoxy is ethoxy.

4. Composition of claim 2 wherein said alkoxy is dodecoxy.

No references cited.

CHARLES B. PARKER, *Primary Examiner.*

ANTON H. SUTTO, *Assistant Examiner.*

U.S. Cl. X.R.

260—606.5, 968, 30.6, 45.7